H. M. STEVENS.
MOTOR OPERATED SWITCH.
APPLICATION FILED MAY 28, 1906.
1,099,625.
Patented June 9, 1914.
5 SHEETS—SHEET 1.
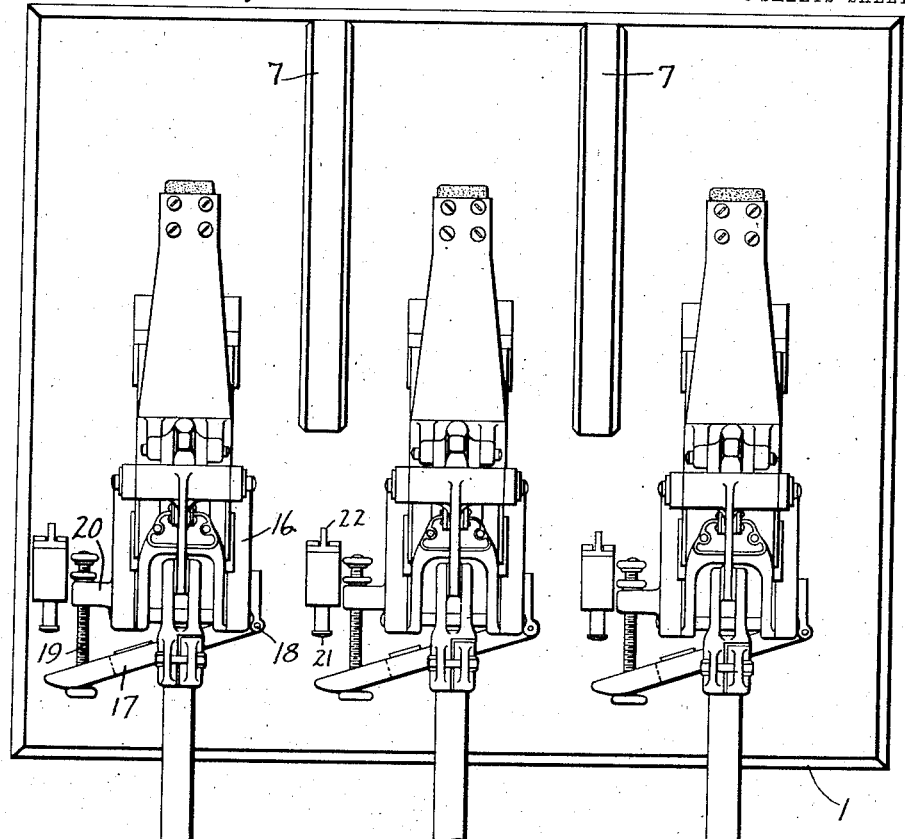
Fig. 1
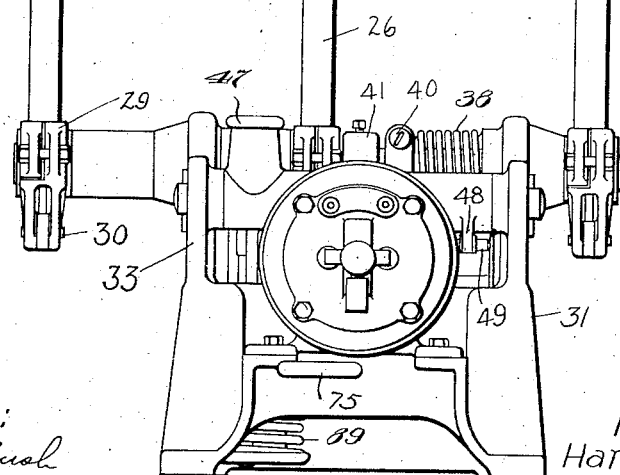
Witnesses:
Lloyd C. Bush
Helen Orford
Inventor:
Harry M. Stevens,
By Albert G. Davis
Atty.

H. M. STEVENS.
MOTOR OPERATED SWITCH.
APPLICATION FILED MAY 28, 1906.

1,099,625.

Patented June 9, 1914.

5 SHEETS—SHEET 3.

Witnesses:
Lloyd C. Bush
Helen Oxford

Inventor:
Harry M. Stevens,
By Albert E. Davis
Atty.

H. M. STEVENS.
MOTOR OPERATED SWITCH.
APPLICATION FILED MAY 28, 1906.

1,099,625.

Patented June 9, 1914.
5 SHEETS—SHEET 4.

Witnesses:
Lloyd C. Bush

Inventor:
Harry M. Stevens,
By
Atty

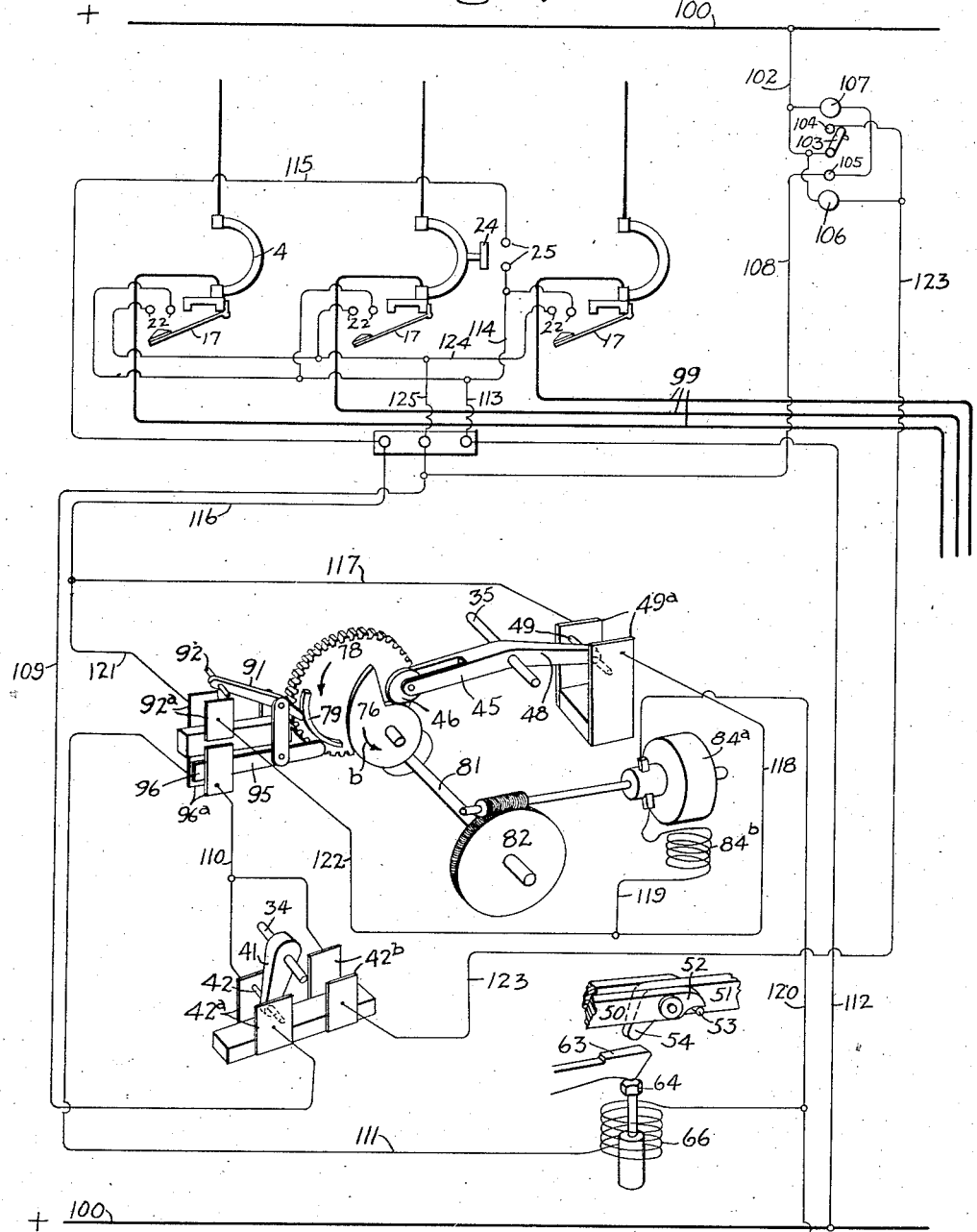

UNITED STATES PATENT OFFICE.

HARRY M. STEVENS, OF SCHENECTADY, NEW YORK, ASSIGNOR TO GENERAL ELECTRIC COMPANY, A CORPORATION OF NEW YORK.

MOTOR-OPERATED SWITCH.

1,099,625.   Specification of Letters Patent.   Patented June 9, 1914.

Application filed May 28, 1906. Serial No. 319,114.

*To all whom it may concern:*

Be it known that I, HARRY M. STEVENS, a citizen of the United States, residing at Schenectady, county of Schenectady, State of New York, have invented certain new and useful Improvements in Motor-Operated Switches, of which the following is a specification.

This invention relates to switches operated by power and controlled at a point remote from the switch.

It is desirable that a switch used for controlling circuits carrying alternating-currents should close quickly and open quickly, and for this purpose, especially where high-tension currents are used, a switch controlled from a remote point is desirable. Many switches of this type heretofore in use have been complicated in structure, containing many parts expensive to manufacture and being difficult to operate by hand in case the supply of power for the motor fails.

The object of this invention is to provide a switch operated by a motor mechanism and controlled from a remote point, which will close the circuit quickly and open it quickly; which will trip free of the operating mechanism and open if an attempt is made to close the switch when there is an overload upon the circuit; which may be operated by hand, to open or close the circuit at the same speed as when operated by the motor mechanism; which may be operated by hand without disconnecting the motor; and in general to improve and simplify the construction of switches of this type.

My invention will best be understood by reference to the accompanying drawings, in which—

Figure 2:
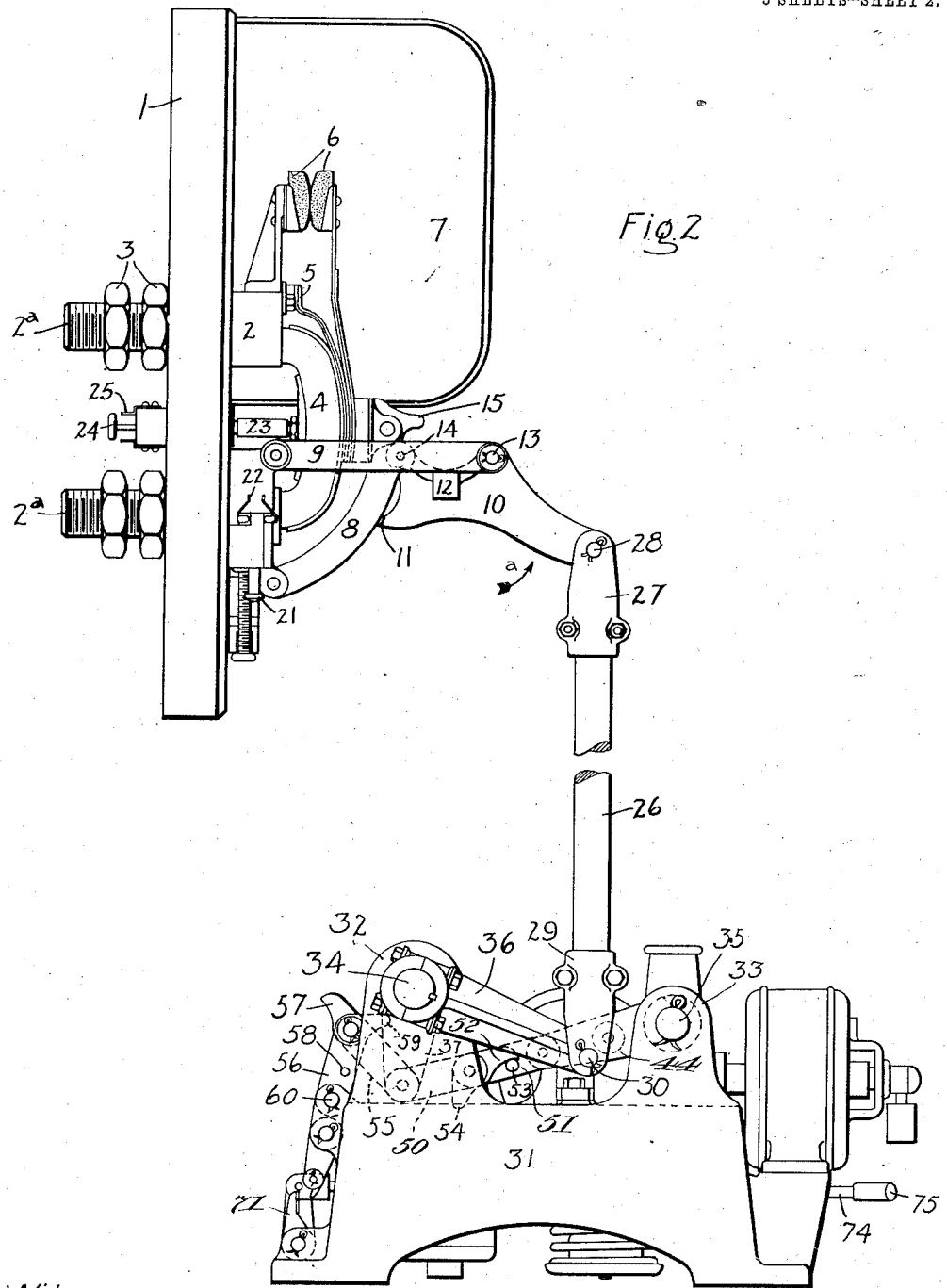
Figure 3:
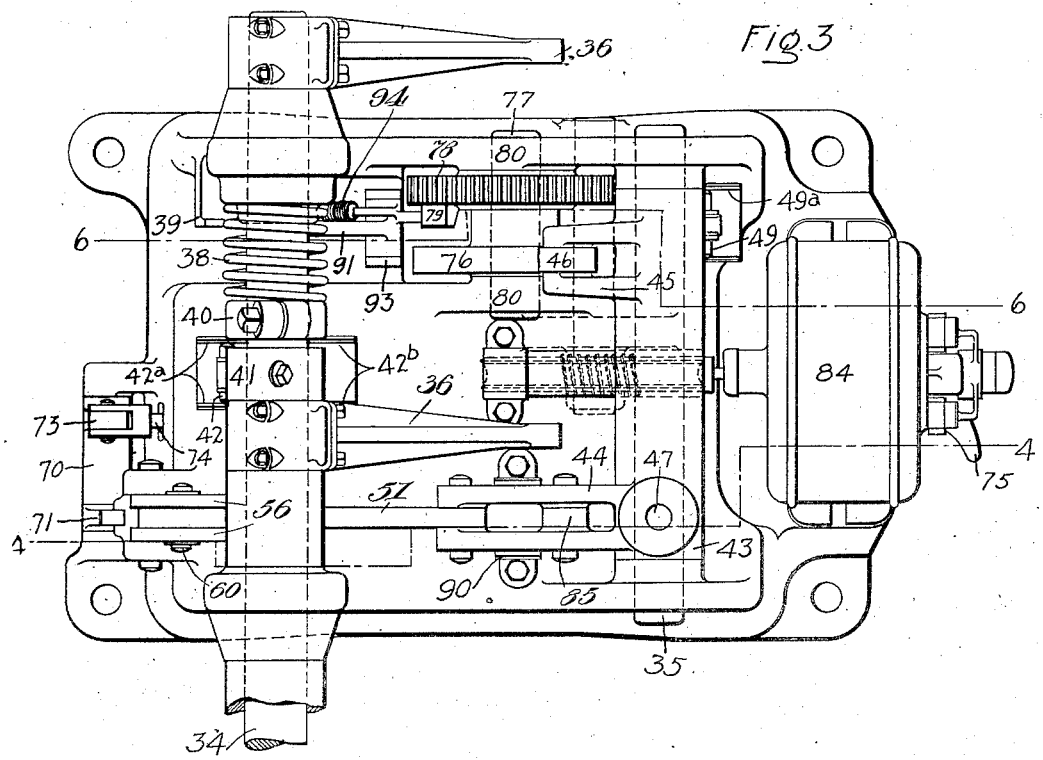
Figure 4:
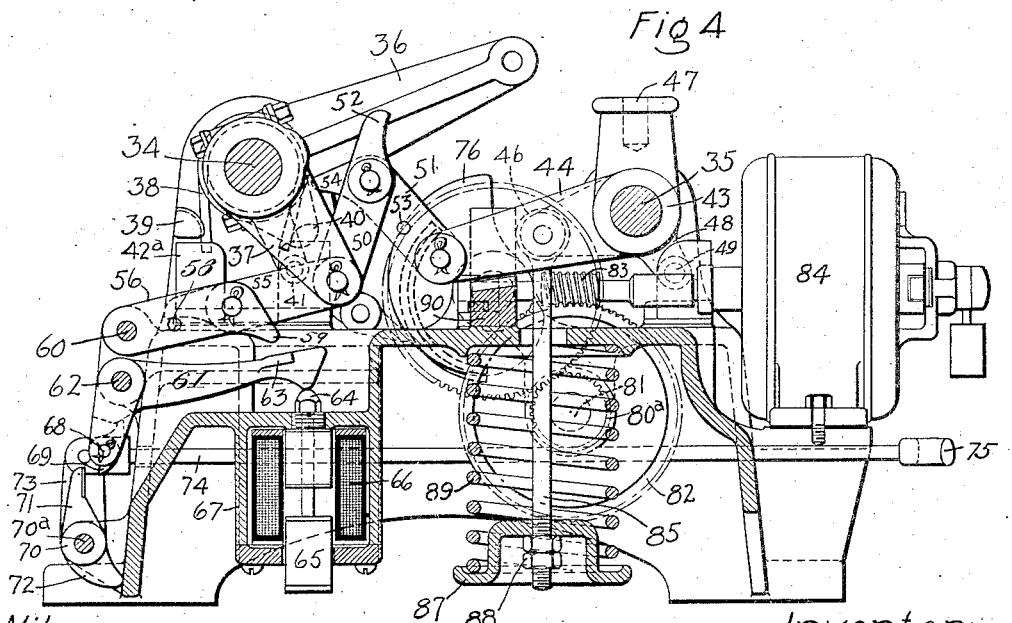
Figure 5:
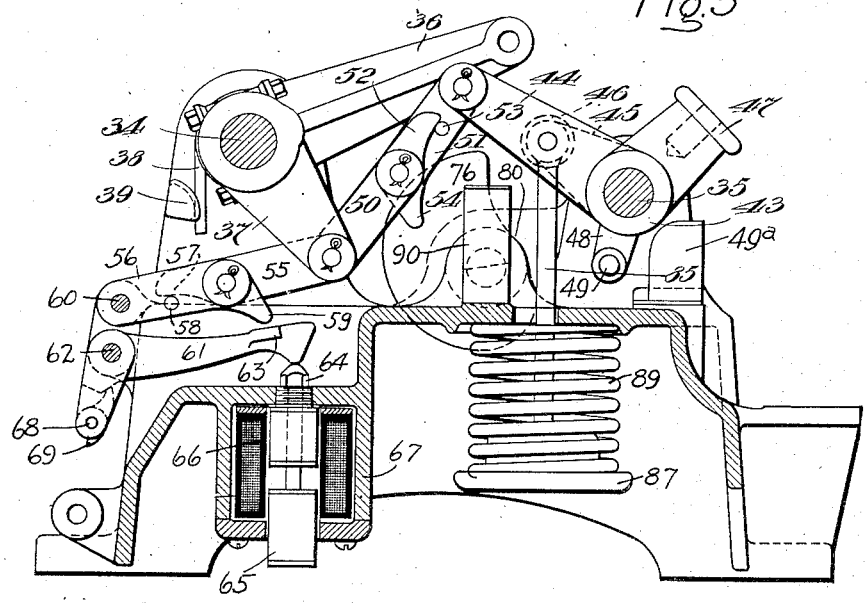
Figure 6:
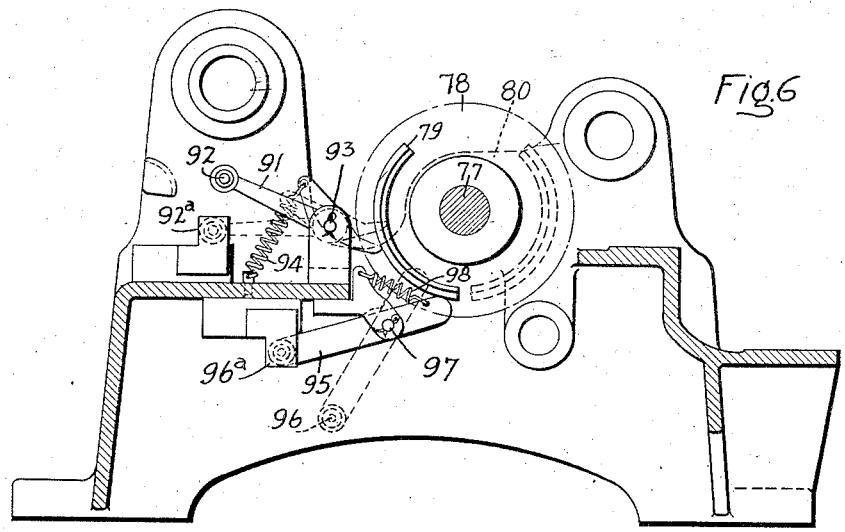

Figure 1 is a plan view showing an operating mechanism controlling three switches for the leads of a three-phase circuit; Fig. 2 an end view of the switch shown in Fig. 1, in the closed position; Fig. 3 a plan view of the switch-operating mechanism; Fig. 4 a sectional view on the line 4—4 of Fig. 3; Fig. 5 a sectional view on the same line, showing the parts in a different position, the motor and the gearing connected thereto being omitted; Fig. 6 a sectional view on the line 6—6 of Fig. 3, with some parts removed; and Fig. 7 a diagram showing the connections and circuits for controlling the switch-operating mechanism.

The switches shown in the drawings for controlling the main circuit are of a well known type, and are no part of the present invention. The switches are mounted upon a panel or switchboard 1 of slate or other insulating material. Each switch consists of fixed contacts 2, having stems $2^a$, and held in position on the switchboard by means of nuts 3, which also serve to attach the leads of the main circuit to the terminals. The circuit between the fixed contacts is closed by means of a bridging contact 4, preferably made of laminations so as to be elastic and come into firm engagement with the contacts 2. Each bridging contact carries a shunt contact 5, preferably of metal, and a secondary shunt contact 6, preferably of carbon or other refractory material, coöperating with similar fixed shunt contacts carried by the panel. When the circuit is opened the final arc is formed between the shunt contacts made of carbon. Barriers 7 of slate or other insulating material are provided between the switches, so as to prevent arcs striking over from the switch in one phase to the switch in another phase. In each switch the bridging contact 4 is secured to one end of a rock-arm 8, the other end of which is pivoted to the panel 1. A cramping frame composed of two links 9 one on either side of arm 8, is also attached to the panel, and a cramping arm 10, carrying a lug 11 and a stop 12, is secured to the cramping frame by means of a pivot 13 and to the rock-arm 8 by means of a pivot 14. The rock-arm 8 also carries a projection 15. The cramping frame, cramping arm 10 and rock-arm 8 form a toggle mechanism, by means of which the bridging contact 4 may be brought into firm engagement with the contacts 2. When the toggle is broken the pivot of the rock-arm 8, the pivot 14 and the pivot 13 form substantially a straight line, the parts being stopped in this position by the engagement of the projection 15 with the stop 12.

The stem $2^a$ of the lower contact 2 is surrounded by an iron yoke 16 in the form of a horse-shoe magnet having an armature 17 secured thereto by means of a pivot 18.

The armature of each of the switches is normally in the position shown in Fig. 1, and the position of the armature in reference to the yoke 16 is controlled by a calibrating screw 19 mounted in a lug 20 secured to the iron yoke. The yoke is magnetized by the passage of the current through the stem 2ª, and tends to attract the armature 17. When the attraction is sufficiently strong the armature is lifted and brought into engagement with the pole-pieces of the yoke 16. The length of the gap between the pole-pieces and the armature, when the armature is in the normal position, may be controlled by the calibrating screw 19, so that the armature will respond only when an excessive current is flowing through the circuit.

Two auxiliary contact devices are mounted on the panel near each switch for the purpose of controlling the switch operating mechanism. One of the auxiliary contact devices consists of a spring-pressed stem 21 normally held in the position shown in Figs. 1 and 2 by means of a spring, not shown. The upper end of this stem carries a bridging contact which, when the stem is lifted against the tension of the spring, comes into engagement with fixed contacts 22 and closes the circuit between said fixed contacts. The stem 21 is mounted in such a position that when the armature 17 is attracted by the yoke 16 the end of the armature engages the end of the stem and moves it so as to close the circuit between the contacts 22. The other auxiliary contact device consists of a stem 23 carrying a bridging contact 24, which may be brought into engagement with fixed contacts 25. A spring not shown tends to move the stem 23 so as to bring the bridging piece 24 into engagement with the contacts 25 and close the circuit. The auxiliary contact device, however, is so placed, as shown in Fig. 2, that when the main switch is closed the bridging contact 4 thereof engages the stem 23 and holds the bridging piece 24 out of engagement with the fixed contacts. It is evident that as soon as the main switch opens the bridging piece 24 engages the contacts 25, thereby closing the circuit between said contacts.

The main switch is operated by means of the cramping arm 10, and when this arm is moved in the direction of the arrow $a$ the switch is opened and the bridging piece 24 closes the circuit between the contacts 25. When the cramping arm 10 is moved in the other direction, the main switch is closed and the bridging contact 4 comes into engagement with the stem 23, thereby pushing the bridging piece 24 out of engagement with the contacts 25. In case of an overload, the iron yoke 16 attracts the armature 17, and the end of the armature engaging the stem 21 causes the circuit between the contacts 22 to be closed.

The cramping arm 10 is connected to the motor-operating mechanism by means of a rod 26, preferably of wood or other insulating material. One end of the rod is connected to the cramping arm by means of a clamp 27 and a pin 28, and the other end is connected to the operating mechanism by means of a similar clamp 29 and pivot 30. The clamps 27 and 29 are adjustably mounted upon the rod 26 so as to provide means for varying the distance between the pivot 30 and the pin 28.

The switch-operating mechanism is mounted upon a base 31, which carries standards 32 and 33. A rock-shaft 34 is suitably mounted in journals in the standards 32, and a pivot-shaft 35 is suitably mounted in the standards 33. The rock-shaft 34 carries switch-operating arms 36 clamped thereto and connected to the rods 26 by means of the clamps 29, and also an actuating arm 37 securely attached to the shaft. A spiral spring 38 encircles the rock-shaft and has one end in engagement with a lug 39 secured to the standard 32; the other end of the spring engages a lug 40 adjustably secured on the rock-shaft, and the relation of these lugs is such that the spiral spring is put under strain when the switch is closed. The rock-shaft 34 also has secured thereto a contact-carrying arm 41 in the end of which is mounted a contact 42, coöperating with two sets of fixed contacts 42ª and 42ᵇ mounted upon the base. The pivot-shaft 35 has mounted thereon an operating sleeve 43, this sleeve having rigidly secured thereto a toggle arm 44, an actuating arm 45, on the end of which is mounted a roller 46, and a contact-carrying arm 48 which carries a contact 49 coöperating with fixed contacts 49ª. The operating sleeve also has a socket 47 into which a bar may be inserted for the purpose of moving the operating sleeve by hand.

The toggle-arm 44 on the operating sleeve 43 is connected to the actuating arm 37 of the rock-shaft 34 by means of a link in the form of a toggle composed of links 50 and 51, the link 50 being connected to the actuating arm 37, and the link 51 being pivoted to the toggle arm 44. The link 50 has a shoulder 52 which engages a stop-pin 53 carried by the link 51, and when this shoulder is in engagement with the stop-pin the toggle is slightly over-set and acts as a rigid connection between the arm 37 and the toggle arm 44. The link 51 also carries a trip-toe 54, by means of which the toggle may be broken. A locking device acting in opposition to the toggle arm 44 is also connected to the arm 37 for the purpose of holding this arm in the position shown in Fig. 4. This locking device is preferably in the form of a toggle composed of links 55 and 56, the link 55 having a shoulder 57 which engages a stop-pin 58 on the link 56, when the toggle is slightly over-set, thereby forming a rigid lock for the arm 37. The link 56 is provided with a tripping-toe 59 similar in function and structure to the tripping-toe 54 of the other toggle. The link 55 is connected to the arm 37, and the link 56 is mounted upon a pivot 60 carried in a lug on the base. When the toggle 55—56 is extended, therefore, there is a rigid connection between the arm 37 and the pivot 60 forming a lock for the arm 37.

In the structure so far described, the toggle 50—51 when extended, forms, in conjunction with the toggle arm 44, an operating toggle or power multiplying connection by means of which the actuating arm 37 may be moved for the purpose of bringing the parts into the position shown in Fig. 2. The toggle 55—56, when extended, locks the actuating arm 37 in the position assumed by the parts when the switch is open, as shown in Fig. 4.

A trip lever 61 made in the form of a bell-crank lever, is mounted on a pivot 62 carried by a lug on the base, and one arm of this trip-lever forms a tripping plate 63, which engages the tripping-toes 54 and 59. The end of the trip-lever adjacent the tripping plate is engaged by a trip-pin 64 carried by the movable core 65 of a solenoid 66 which is mounted in a casing 67 formed in the base. On the other end of the trip-lever a dog 69 is mounted upon a pivot 68. This dog is provided with a projection which engages a shoulder on the trip-lever and locks the dog with reference to the trip-lever when the dog is moved in one direction, but leaves the dog free to swing about the pivot when moved in the other direction. A trip-sleeve 70 is carried by a pin 70ª mounted in lugs on the base near the trip-lever 61, and carries a trip-arm 71 and a heel 72. An operating arm 73 is also rigidly attached to the trip-sleeve, and connected to this arm is a trip-rod 74 having a handle 75. When the solenoid 66 is energized the trip-pin 64 is raised and raises the trip-lever 61 into operative position. The lever can also be raised to operative position by means of the handle 75, since the actuation of this handle brings the trip-arm 71 into engagement with the dog 69. When the trip-arm 71 engages the dog 69, the heel on the dog engages a projection on the trip-lever, forming a rigid connection therewith, and the trip-lever 61 is swung about the pivot 62 into operative position. When the operator pulls the handle 75 to the right he must exert considerable force to break the toggle against which the trip-lever 61 is pressing. When the toggle breaks, however, the resistance to the movement of the trip-lever is removed, and the handle 75 moves suddenly to the right, carrying the trip-arm 71 past the dog 69 and free from the trip-lever 61. As a result the trip-lever is permitted to fall back to normal inoperative position, and hence, under ordinary conditions, there is no danger of the trip-lever 61 being held in operative position so as to prevent the setting of the toggles and the operation of the switch. To again operate the trip-lever by hand it is necessary to push the handle 75 to the left until the trip-arm 71 again operatively engages the dog 69.

The movement of the rock-shaft 34 is caused by oscillating the operating sleeve 43 upon the pivot 35. For the purpose of moving the operating sleeve 43 an actuating cam 76 of spiral form and engaging the roller 46 is provided: and, as a result of the form of this cam, the roller carrying arm 45 is gradually raised, bringing the toggle-arm 44 into the position shown in Fig. 5. When the toggle-arm 44 has been moved to this position the high part of the cam 76 passes from under the roller 46 and the operating sleeve 43 would then be free to move back to the position shown in Fig. 4, if it were not restrained by some kind of locking means. The cam 76 is keyed upon a cam-shaft 77, to which is attached a gear-wheel 78 having on one side thereof a cam 79. The cam-shaft is suitably mounted in journals 80 secured to the base. The gear-wheel 78 engages with a spur-gear 80ª, carried upon a counter-shaft 81 upon which is secured a worm-gear 82 engaging a worm 83 driven by a motor 84. This motor is mounted upon the base, as shown, and may be of any suitable kind, although I have shown an electromotor, which is preferably used. A rod 85, connected to the operating sleeve 43 in any convenient way, preferably by being pivoted to the toggle-arm 44, extends through an opening in the base and carries at the lower end thereof a disk 87 held in position by lock-nuts 88 threaded upon the rod. By means of these lock-nuts the position of the disk upon the rod can be altered. A spiral spring 89 surrounds the rod 85, and has one end in engagement with the base, while the other end is in engagement with the disk 87. It is apparent that any other form of power-storing device could be substituted for the spring 89, and the spiral spring shown is only one of the many forms in which this part of the device may be embodied. A buffer 90 is secured to the base in position to be encountered by the toggle-arm 44 when said arm assumes the position shown in Fig. 4. As the cam 76 rotates and raises the actuating-arm 45 the toggle-arm 44 is also raised, putting spring 89 under compression; when the parts reach the position shown in Fig. 5, the spring is under compression and tends to straighten out the operating toggle formed by the toggle-arm 44 and the over-set toggle 50—51, but is held in the position shown in Fig. 5 by a locking means comprising the toggle 55—56. When the locking means is released the expansion of the spring 89 straightens out the operating toggle, causing the parts to assume the position shown in Fig. 2.

Controlling switches for the circuit of the motor are conveniently mounted upon the base, so as to be operated by the movement of the switch-operating mechanism. The switches of which the contacts 42 and 49 are elements have already been described. A switch-arm 91, carrying a contact 92 which coöperates with fixed contacts $92^a$, is mounted upon a pivot 93, and a spring 94 connected to the switch-arm tends to move the contact 92 into engagement with the fixed contacts $92^a$ and close the circuit. Another switch-arm 95 mounted in the same vertical plane as the switch-arm 91 and carrying a contact 96 which coöperates with fixed contacts $96^a$ is mounted upon a pivot 97. A spring 98 connected to the switch-arm 95 tends to hold the contact 96 out of engagement with the fixed contacts $96^a$, thereby tending to open the circuit in which the contacts $96^a$ are included. The functions of these switches will be explained in the description of the operation of the device.

As shown in Fig. 7 the bridging contacts 4 control the leads 99 of the main circuit. A control-circuit for the switch-operating mechanism is provided, having positive leads 100 and a negative lead 101. A lead 102 connects the positive lead with the blade 103 coöperating with fixed contacts 104 and 105 of the controlling switch. Signal lamps 106 and 107 are provided, the lamp 106 being connected in parallel with the switch-blade 103 and the contact 104, while the lamp 107 is connected in parallel with the switch-blade 103 and the fixed contact 105. As a result of this arrangement, when the switch-blade 103 is in engagement with the contact 104 practically all the current will flow through the switch-blade and the lamp 106 will be extinguished, while for the same reason when the switch-blade 103 is in engagement with the fixed contact 105 the lamp 107 will be extinguished.

The operation of the device is as follows: The mechanism is shown in Fig. 7 in the position assumed by it when the main circuit is closed. If it be desired to open the main circuit, the switch-blade 103 is thrown into engagement with the fixed contact 105, which operation, for the reasons above noted, extinguishes the lamp 107 and thereby indicates to the operator that the main switch is being opened. Current then flows from the positive lead 100 through the lead 102, switch-blade 103, contact 105, leads 108 and 109, fixed contacts $42^a$, contact 42, lead 110, contact 96, fixed contacts $96^a$, lead 111, through the trip-coil 66, and to the negative lead 101. The circuit is thus completed and the trip-coil is energized, bringing the trip-pin into engagement with the trip-lever 61, and throwing the trip-plate 63 into engagement with the tripping-toe 54, thereby breaking the toggle 50—51 and permitting the rock-shaft 34 to move to the position shown in Fig. 4, this movement being due partly to the weight of the switch and partly to the tension of the spiral spring 38. This same movement causes the contact 42, which is mounted upon contact-carrying arm 41 on the rock-shaft, to move out of engagement with the contacts $42^a$ thus deënergizing the trip coil and allowing the trip-pin 64 and the tripping plate 63 to return to inoperative position, while the contact 42 moves into engagement with the contacts $42^b$. At the same time, the opening of the main switch has permitted the spring-pressed stem 23 to draw the bridging-piece 24 into engagement with the contacts 25, thereby closing a circuit between said contacts 25. As a result of these changes in the connections, current now flows from the positive lead 100 through the leads 112, 113, 114, across the gap between the contacts 25, which is now closed by the bridging-piece 24, thence through the leads 115, 116, 117, contact 49, fixed contacts $49^a$, leads 118, 119, through the field $84^b$ of the motor, through the armature of the motor and back to the negative lead 101 by way of the lead 120. The motor circuit is thus completed and the motor begins to run. It will be observed that this circuit through the motor is entirely independent of the control-switch, and therefore the operator is powerless to stop the motor by moving the switch-blade 103 away from the contact 105. When the motor starts, the gear-wheel 78 and the cam 76 are turned in the direction of the arrows $b$. As the gear-wheel 78 rotates, the cam 79 passes from under the end of the switch-arm 91, and the spring 94 draws the contact 92 into engagement with the fixed contacts $92^a$. Further rotation of the gear-wheel 78 moves the cam 79 from under the end of the switch-lever 95 and the spring 98 then draws the contact 96 away from the fixed contacts $96^a$, thereby opening the circuit through the trip-coil 66 at that point. At this time, therefore, it is impossible by means of the control-switch either to stop the motor or to energize the trip-coil 66. As the gear-wheel 78 and the cam 76 continue to rotate, the cam by its engagement with the roller 46 lifts the actuating arm 45, thereby putting the spring 89 under compression, and at the same time moving the contact 49 out of engagement with the fixed contacts $49^a$, and breaking a circuit through the motor by way of leads 117 and 118. Before this occurs, however, the contact 92 has come into engagement with the fixed contacts $92^a$, and current now flows from the lead 116 through the lead 121, contact 92, leads 122 and 119 to the motor, hence the opening of the circuit by the contact 49 does not stop the operation of the motor. The motor continues to run until the high part of the cam 76 passes from under the roller 46, at which time the spring is fully compressed and the parts of the operating mechanism are as shown in Fig. 5; being held in this position by the locking connection of the over-set toggle 55—56. As the high part of the cam passes from under the roller 46, the leading end of the cam 79 engages the end of the switch-arm 91, moving the contact 92 out of engagement with the contact $92^a$ and thereby opening the motor circuit. Since there is, however, no load at this time upon the motor, the momentum is sufficient to carry the cam and gear-wheel 78 into the position shown in Fig. 7, and the completion of this movement brings the cam 79 into engagement with the switch-arm 95, thereby throwing the contact 96 into engagement with the fixed contacts $96^a$ and closing the circuit between the leads 110 and 111. At the completion of the series of operations above described, therefore, the main circuit is open and the spring 89 is under tension, ready to close the switch at any time. The switch may also be opened as a result of an overload upon the circuit, in which case the armature 17 is attracted by the yoke 16 to close the gap between the contacts 22. When this occurs, current flows from the positive lead 100 by way of the leads 112, 113, 114, across the gap between the contacts 22 to the leads 124 and 125, and thence to the lead 109. The operation is then the same as that above described when the circuit is closed by bringing the switch-blade 103 into engagement with the contact 105.

When the switch is open the parts are in the position shown in Fig. 7, except that the contact 42 is in engagement with the fixed contacts $42^b$, the bridging-piece 24 is in engagement with the contacts 25, the actuating arm 45 is raised, and as a result of the parts being in the position shown in Fig. 5, the tripping-toe 59 of the locking toggle 55—56 instead of the tripping-toe 54 of the toggle 50—51, is over the trip-plate 63. If, with the parts in these positions, it be desired to close the switch, the switch-blade 103 is brought into engagement with the contact 104; the lamp 106 is short-circuited and extinguished, and current flows from the lead 100 through the lead 102, switch-blade 103, fixed contact 104, lead 123, contacts $42^b$ and contact 42, lead 110, contacts $96^a$ and contact 96, lead 111, through the trip-coil 66 to the negative lead 101. The trip-coil is energized, breaking the toggle 55—56, and permitting the spring 89 to expand, which thereby straightens out the operating toggle formed by the toggle-arm 44 and the over-set toggle 50—51, and moves the rock-shaft to the position shown in Fig. 2, whereby the main switch is closed. When the main switch closes, contact 42 is moved out of engagement with the contact $42^b$ and into engagement with the contacts $42^a$. This movement breaks the circuit through the trip-coil and the parts assume the position shown in Fig. 7. The motor is not operated when the switch is closed, since the switch when closed is always in condition to open quickly and it is unnecessary to keep the spring 89 under strain, except during the time the switch is open.

It is apparent that if for any reason the control-circuit becomes disarranged, or the motor becomes inoperative, the switch may be closed by means of a bar or lever inserted in the socket 47 of the operating sleeve 43 to rock the sleeve 43 and put the spring 89 under compression. Whenever the switch is inoperative for either of the above reasons, the cam 76 is in the position shown in Fig. 4, and does not interfere in any way with the movement of the operating-sleeve 43 by hand. Since under the conditions the only way in which the switch can be closed by hand is by first compressing the spring 89 and then tripping the switch by means of the handle 75, it is evident that the switch is closed as rapidly when operated by hand as when operated by the motor. Since, also, the only way in which the switch can be opened is by breaking the locking toggle 50—51, it is apparent that the switch opens as rapidly when opened by hand as it does when opened by the trip-coil 66. The switch, therefore, can be operated by hand without making any changes or disconnecting any parts, and when so operated works in the same way as though driven by the motor.

The motor 84 may be disabled, thereby necessitating the operation of the switch by hand, although the supply of current to the leads 100 and 101 is not interrupted. Under these conditions the switch can be tripped and closed by means of the handle 75. As above explained, as soon as the locking toggle 55—56 is broken the trip-lever 61 is freed from the control of the hand tripping mechanism and falls back into inoperative position, as shown in Fig. 4. The trip lever 61, however, is always in operative position, as regards the trip-coil 66, and hence, if an overload exists upon the line when the switch is being closed, the trip-coil 66 is energized as soon as the switch contacts engage, thereby lifting the trip-lever 61 and breaking the toggle 50—51 and permitting the switch to open immediately.

It is evident that even though the motor 84 be inoperative and the spring 89 be broken the switch can still be operated by means of a lever inserted in the socket 47. Under these circumstances the sleeve 43 must be oscillated in both directions by hand, and the speed of closing of the switch, therefore, is only that due to hand-operation. The switch may, however, be opened as quickly as when operated by the motor, since the rapidity of opening is not affected by the manner in which the switch is closed.

Obviously, many changes and alterations may be made in the embodiment of my invention, and I, therefore, do not wish to be restricted to the precise form shown and described, but intend to cover by the claims all changes and modifications within the spirit and scope of my invention.

What I claim as new and desire to secure by Letters Patent of the United States, is,—

1. In an electric switch, the combination with a switch member, of an actuating spring, a normally positive collapsible connection between said spring and said member to permit movement of said member independently of said spring, a device for setting said spring under strain, and means for operating said device upon collapse of said connection.

2. In a switch actuating mechanism, the combination with an actuating spring, of a member connected to said spring, a cam for moving said member to put said spring under strain, means for bringing the cam into and out of engagement with said member, and locking means for engaging said member to hold the spring under strain.

3. In an electric switch, an actuating spring, an actuating member connected to said spring, a cam for moving said actuating member to strain said spring, auxiliary means for moving said member away from said cam to strain said spring, and locking means for holding said spring under strain.

4. In a switch operating mechanism, the combination with an actuating spring, of a cam movable to a predetermined position and shaped to put the spring under strain during its movement and finally leave the spring free to expand when the cam reaches said position, means for moving said cam to said position, and locking means for retaining the spring under strain.

5. The combination with a switch operating member, of an operating toggle connected to said member to close the switch when said toggle is straightened, an actuating spring connected to said toggle to straighten it as said spring expands, means for forcibly breaking said toggle and thereby putting said spring under strain, and restraining means for holding said spring set under strain.

6. In an electric switch, an operating member, an operating toggle connected to said member, a spring connected to one of the toggle links and tending to straighten the toggle, a cam for moving said toggle link to put the spring under strain, and driving means for said cam.

7. The combination with a switch operating arm, of an operating toggle connected thereto, a spring for straightening said toggle, means for breaking said toggle and thereby putting said spring under tension, and locking means for said toggle.

8. The combination with a switch-arm, of an operating toggle having one link connected to the arm and the other link pivoted to a stationary lug, a spring connected to one of said links to straighten the toggle when the spring expands, a motor, and a cam driven thereby to compress said spring.

9. The combination with a switch-arm, of an operating toggle having one link connected to the arm and the other link pivoted to an abutment for resisting the thrust of said toggle, a spring connected to one of said links to straighten the toggle when the spring expands, a motor and a spiral cam driven thereby to compress said spring.

10. A rock-shaft having a switch operating arm thereon, a pivot parallel to said rock-shaft, a sleeve mounted upon said pivot, arms on said sleeve, a toggle connection between one of said arms and said switch operating arm, a cam engaging another of said arms, and means for rotating said cam.

11. A rock-shaft having a switch operating arm thereon, a pivot parallel to said rock-shaft, a sleeve mounted upon said pivot, arms on said sleeve, a toggle connection between one of said arms and said switch operating arm, a cam engaging another of said arms to break said toggle connection, means for rotating said cam, a spring connected to one of said arms and strained by said cam, and locking means for holding said spring strained.

12. The combination with a switch-arm, of an operating toggle connected to said arm, one link of said toggle being a normally positive collapsible connection, means for collapsing said connection and an actuating spring connected to the toggle to straighten it as the spring expands.

13. The combination with a switch member, of operating means connected to said member by a normally positive collapsible connection, a fixed abutment, a normally collapsible connection between said abutment and said member, and common means for collapsing either of said connections.

14. The combination with a rock-shaft having an arm thereon, of a fixed lug on each side of said rock-shaft, a normally positive collapsible connection between one of said lugs and said arm, and a spring actuated operating toggle between the other lug and said arm.

15. The combination with a switch operating arm, of a fixed abutment, a normally positive collapsible connection between said arm and said abutment, spring operating means, and a normally positive collapsible connection between said operating means and said arm.

16. The combination with a rock-shaft having an arm thereon, of a fixed lug on each side of said rock-shaft, a normally positive collapsible connection between one of said lugs and said arm, and an operating toggle between the other lug and said arm, one of the links of said toggle being a normally positive collapsible connection.

17. The combination with a rock-shaft having an arm thereon, of a lug on each side of said rock-shaft, a normally positive collapsible connection between one of said lugs and said arm, an operating toggle between the other lug and said arm, one of the links of said toggle being a normally positive collapsible connection, and common means for collapsing either of said connections.

18. A switch operating arm, locking means connected to said arm to hold said switch open, closing means for said switch, a normally positive collapsible connection between said closing means and said arm, and a common tripping means operative on said locking means when the switch is open and on said connection when the switch is closed.

19. In a switch operating mechanism, the combination with a spring, of an operating member actuated by said spring, a cam for setting said spring under strain and leaving it free to expand, locking means for holding said spring under strain, a motor for actuating said cam, and a switch actuated by said cam for controlling the operation of said motor.

20. In a switch operating mechanism, the combination with a spring, of an operating member actuated by said spring, a member for setting the spring under strain when moved, a cam having a working face formed with a gradual rise for moving said member and an abrupt drop to permit the spring to expand freely to actuate said operating member, an electric motor for actuating said cam, and a switch actuated by said cam for controlling the motor.

21. The combination with a main switch of a spring for operating said switch, automatic mechanism for setting said spring under strain, and means actuated by the main switch when it opens to cause said automatic mechanism to operate.

22. In an operating mechanism for electric switches, the combination with an actuating member movable in two directions for operating the switch, of a spring for moving said member in one direction, a motor-operated cam for moving said member in the other direction, and means for manually moving said member in both directions.

23. In an electric switch, the combination with tripping mechanism comprising restraining means for holding the switch closed, of a manually operable member having two extreme positions, in both of which said restraining means is free to hold the switch closed, said member being movable to a point between said extreme positions to actuate said restraining means and thereby trip the switch open.

24. In an electric switch, the combination with tripping mechanism comprising restraining means for holding the switch closed, of a manually operable member mounted to move between two extreme positions, and connections between said member and said restraining means whereby said restraining means is actuated to trip the switch only when said member is between its extreme positions.

25. In an electric switch, the combination with a restraining means for normally holding the switch closed, of a manually operable member mounted to move in one direction through a tripping position into an extreme position, and connections between said restraining means and said member whereby said restraining means is actuated to trip said switch only during the movement of said member through tripping position.

26. In an electric switch, the combination with a locking toggle for holding the switch closed, and a tripping lever for breaking said toggle to permit said switch to open, of a manually operable member for actuating said lever, and connections between said lever and said member whereby said lever is first brought into engagement with said toggle and is then released during a continuous movement of said member in one direction.

27. In an electric switch, the combination with a locking toggle for holding the switch closed, a tripping lever for breaking said toggle, and electroresponsive means for operating said tripping lever, of a manually operable member mounted to move into tripping position to operate said lever to break said toggle and to continue its movement into extreme position to permit said lever to return to inoperative position.

In witness whereof, I have hereunto set my hand this 25th day of May, 1906.

HARRY M. STEVENS.

Witnesses:
G. C. HOLLISTER,
HELEN ORFORD.